(No Model.) 2 Sheets—Sheet 2.

J. F. SHAWHAN.
COMBINED MOTOR AND ELECTRIC GENERATOR.

No. 401,761. Patented Apr. 23, 1889.

Witnesses.
Jno. G. Hinkel Jr.
H. S. McArthur

Inventor,
Jabez F. Shawhan
by Foster & Freeman
Attorneys

UNITED STATES PATENT OFFICE.

JABEA F. SHAWHAN, OF DAYTON, OHIO, ASSIGNOR OF ONE-HALF TO JAMES W. CARPENTER, OF SAME PLACE.

COMBINED MOTOR AND ELECTRIC GENERATOR.

SPECIFICATION forming part of Letters Patent No. 401,761, dated April 23, 1889.

Application filed March 23, 1888. Serial No. 268,268. (No model.)

*To all whom it may concern:*

Be it known that I, JABEA F. SHAWHAN, a citizen of the United States, residing at Dayton, in the county of Montgomery and State of Ohio, have invented certain new and useful Improvements in Electric Generators and Means for Operating Them, of which the following is a specification.

My invention relates to dynamo or magneto electric generators and means for operating them; and it has for its object to produce an improved electric generator which shall be simple of construction and compact in form, and be capable of being driven by an engine connected directly thereto, which is also simple and compact, the object being primarily to produce a generator and a motor for driving the same which shall be adapted, among other things, for use on locomotives for head-light purposes and the like; and to these ends my invention consists in the constructions and arrangements of parts, substantially as pointed out more particularly hereinafter.

Figure 1:
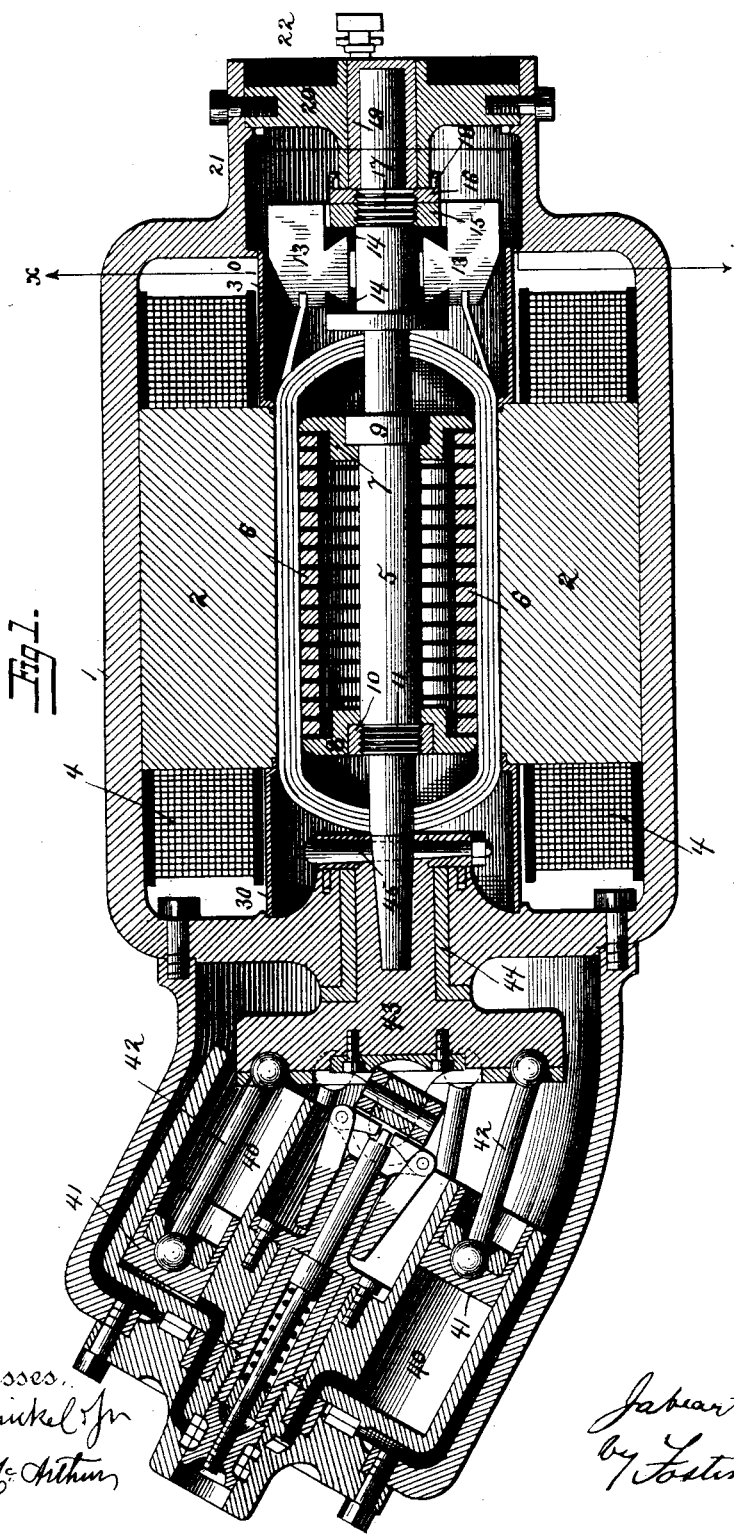
Figure 2:
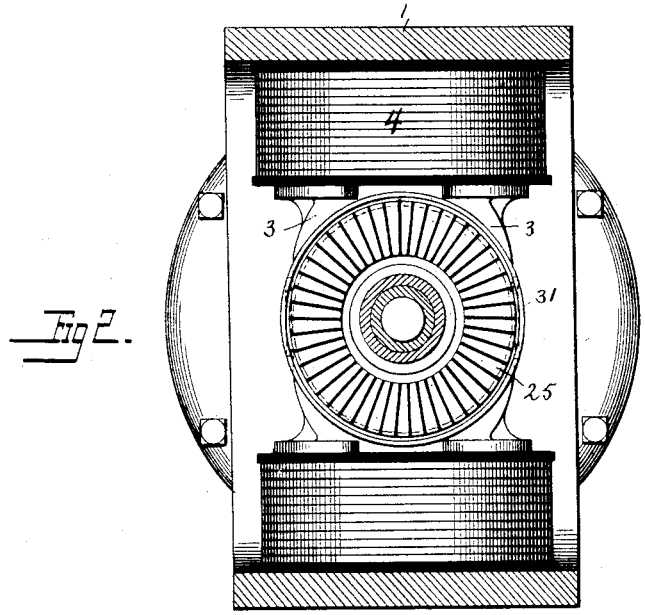
Figure 5:
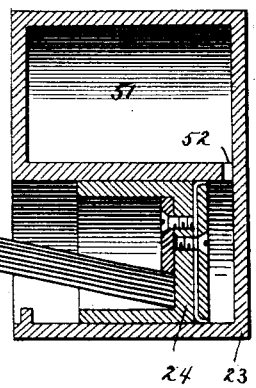
Figure 3:
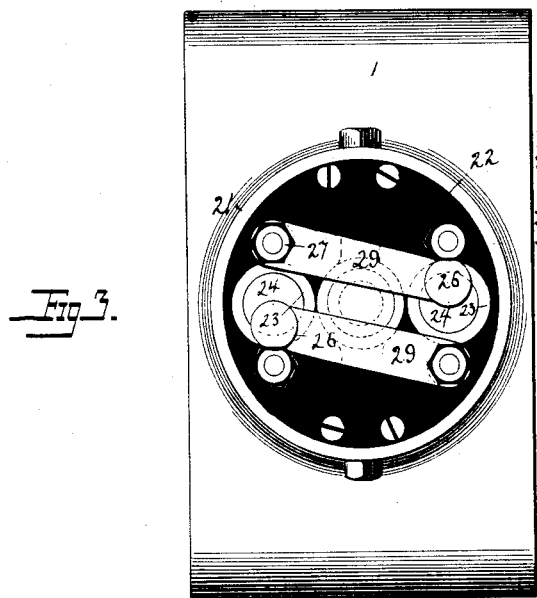
Figure 4:
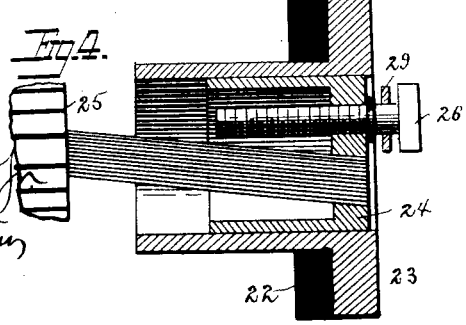

Referring to the accompanying drawings, Figure 1 is a transverse sectional view of my improved generator and one form of engine attached thereto for operating it. Fig. 2 is an end view, partially in section, taken on the line $x\ x$, Fig. 1. Fig. 3 is an end view showing the arrangement of commutator-brushes. Fig. 4 is a detail, and Fig. 5 is a modification thereof.

In the drawings, 1 is the supporting-frame of the generator, which also forms the neutral portions of the field-magnets 2, which have projecting polar extensions 3 and are surrounded by the field-magnet coils 4. Between the polar extensions is placed an armature of any suitable construction, and I have shown one mounted on the armature-shaft 5, consisting of the rings 6, of magnetic material, separated from each other by insulating material and bound securely together by the end pieces or disks, 7 8, one of which abuts against a collar, 9, on the shaft 5, and the other is adjustably held in position by the screw-nut 10, working upon the screw-threaded portion 11 of the shaft 5. This armature-cylinder is wound in any desired manner, according to the current to be generated, and I have shown one well-known form of cylinder-winding in which the terminals of the coils 12 are each connected to a plate, 13, in the commutator. This commutator is made up of a series of plates, 13, mounted upon the armature-shaft 5, being insulated therefrom by insulating-rings 14, the internal faces of the commutator-plates being suitably shaped, as shown, to be clamped by said rings and to be held securely in position by the nuts 15 16, working in screw-threads 17 on the shaft. One of these nuts, 16, is formed with a small cavity, 18, to receive and hold the oil which may work out of the bearing of the shaft and prevent the same from coming in contact with the plates of the commutator. This armature-shaft 5 is supported in a bearing, 19, formed in a cross-bar or plate, 20, which is secured in the projection or hood 21, formed as a part of or attached to the main frame 1, and the other end is shown as fitting into a recess in the bearing of the disk of the engine; but it will be understood, of course, that the arrangement of this end of the shaft will depend upon the nature of the driving-engine.

Mounted in the end of the hood 21 is a plate, 22, preferably of insulating material, which serves as a support for the case 23 of the brush-holders. The brushes may be made of any material, as a number of plates of copper, or of a single plate of copper joined to or formed into an extension, 24, which fits into the casing 23, and these brushes are arranged parallel with the axis of the commutator and bear upon the faces 25 of the commutator-sections, which are arranged radially around the shaft of the armature, as shown. By thus arranging the working-faces of the commutator-plates at right angles to the shaft I am enabled to make a very compact and simple construction.

Secured to the face-plate 22 are springs 29, with their free ends bearing upon the extension 24 of the brushes, and screws 26 are provided in the free ends of the springs, whereby the pressure of the brushes upon the commutator may be adjusted. By this means the pressure on the brushes may be regulated, so that a proper bearing may be had and the wear upon their ends in contact with the commutator may be compensated for. In order to remove the brushes for the purpose of replacing others it is only necessary to loosen one of the nuts 27, when the spring 29 can be swung out of position and the brush removed, and it will be seen that I make use of one of the nuts or bolts 27 to hold the spring that is used in confining the brush-case 23 in position.

In Fig. 5 I have shown a modified arrangement for holding the brushes against the commutator, in which the brushes are held, as before, in an extension, 24, in a cylinder or casing, 23, having a closed end, and above this is placed a reservoir, 51, containing some fluid, as oil, and a small passage, 52, is formed between said reservoir and the casing, so that the fluid may flow therein.

It will be seen that as the end of the brush wears away the weight of the fluid in the reservoir will cause it to flow into the casing behind the brush-extension, and thereby maintain the pressure on the brush uniform until it is practically used up.

In using the generator in exposed positions—as, for instance, for locomotive headlight purposes—it is desirable, and indeed necessary, to protect the operating parts from extraneous substances, and in order to do this I apply a casing, 30, between the frame and the magnets at each end of the armature, and I also connect the polar extensions 3 by a plate, 31, of non-magnetic material, and as the hood 21, which is formed with or attached to the frame of the machine, is inclosed by the insulating-plate 22, it will be seen that all the operative parts of the generator are protected, while the field-magnet coils 4 are exposed, and this exposure operates to maintain the fields cool and prevent any undue heating.

It will be seen that by this construction and arrangement I am enabled to produce a very simple and compact generator having all the operating parts protected, so that it is well adapted for use in exposed positions.

While the armature may be driven by any desired power, I have shown an engine supported in an extension of the case, which is bolted directly to the frame 1, and this engine I have found to be a very simple and effective one, operating at high rates of speed, and not liable to get out of order; but as it forms no part of my invention, being covered in a separate application for patent, it is only necessary to state that it consists, generally, of a number of cylinders, 40, each provided with a piston, 41, connected by a link, 42, to a disk, 43, which is supported in bearings 44 in the frame 1, and which furnishes a support for one end of the armature-shaft 5, and is positively connected therewith by any suitable means, as a pin, 45. It will thus be seen that the single bearing furnishes a support for a portion of the engine, as well as for one end of the armature-shaft.

By the above arrangement I produce a combined generator and motor therefor which is exceedingly simple and compact, and all the operative parts of both the engine or motor and the generator are protected from exposure to the elements, while the field-magnets, which are not liable to be damaged by exposure, are unprotected.

It will be evident that while I have thus specifically described the construction and operation of my generator, and enough to indicate the character of the motor, I am not limited to the precise construction set forth, nor to the arrangements of parts shown, as portions of my invention may be used separately or together with other equivalent arrangements of devices without departing from the principles thereof.

I claim—

1. In an electric generator, a frame supporting the field-magnets and provided with a contracted hood extending from one end thereof, and an armature-shaft, one end of which is supported in the frame and the other in the hood, a commutator arranged within the hood, and commutator-brushes supported by said hood, substantially as described.

2. In an electric generator, a supporting-frame carrying the field-magnets and provided with a hood extending from one end thereof, a cross-bar arranged in said hood, and an armature-shaft, one end of which is supported in said cross-bar and the other is supported in the frame, substantially as described.

3. In an electric generator, a frame supporting the field-magnets and having a hood extending from one end thereof inclosing the commutator and brushes, and a casing surrounding the exposed portions of the armature between the field-magnets and the frame, substantially as described.

4. In an electric generator, a frame supporting the field-magnets and having a hood projecting from one side thereof, a disk of insulating material closing the end of said hood, and casings extending between the field-magnets and the frame, whereby the armature and commutator and brushes are completely protected from exposure, substantially as described.

5. In an electric generator, an armature-shaft, a commutator supported thereon, and screw-nuts for holding said commutator in position, one of the nuts being provided with a recess for the reception of oil, substantially as set forth.

6. In an electric generator, a frame supporting the field-magnets, a hood projecting from said frame, and having a cross-bar supporting the armature-shaft, a commutator upon said armature-shaft, a disk of insulating material closing said hood, and commutator-brushes supported in said disk and arranged parallel to said shaft to make contact with the commutator-sections at right angles to the shaft, substantially as described.

7. In an electric generator, a frame supporting the field-magnets, a hood extending therefrom, a disk of insulating material secured in said hood, sleeves secured to said insulating material, and commutator-brushes in said sleeves and arranged parallel with the armature-shaft, substantially as described.

8. In a combined electric generator and motor therefor, a frame supporting the field-magnets, provided with a hood inclosing the commutator and brushes therefor, a casing between the field-magnets and frame inclosing the exposed portions of the armature, and a casing secured to the other end of the frame inclosing the motor connected to the armature-shaft, whereby all the operative parts of the generator and motor are protected from exposure, substantially as described.

9. In an electric generator, a frame supporting the field-magnets, casings arranged between the field-magnets and frame, and a hood inclosing the commutator and brushes, whereby the operative parts of the generator are protected from exposure while the field-magnets are exposed to the air, substantially as described.

10. In an electric generator, the combination, with an armature-shaft carrying a commutator, of a disk of insulating material, casings attached to said disk, commutator-brushes sliding in said casings, springs secured to the disk and bearing upon the end of said brushes, and adjusting-screws in the ends of the springs, substantially as described.

In testimony whereof I have signed my name to this specification in the presence of two subscribing witnesses.

JABEA F. SHAWHAN.

Witnesses:
WEBSTER W. SHUEY,
T. BEN. CARPENTER.